A. GRAY.
IMPLEMENT.
APPLICATION FILED SEPT. 3, 1914.
1,219,726.
Patented Mar. 20, 1917.
2 SHEETS—SHEET 2.
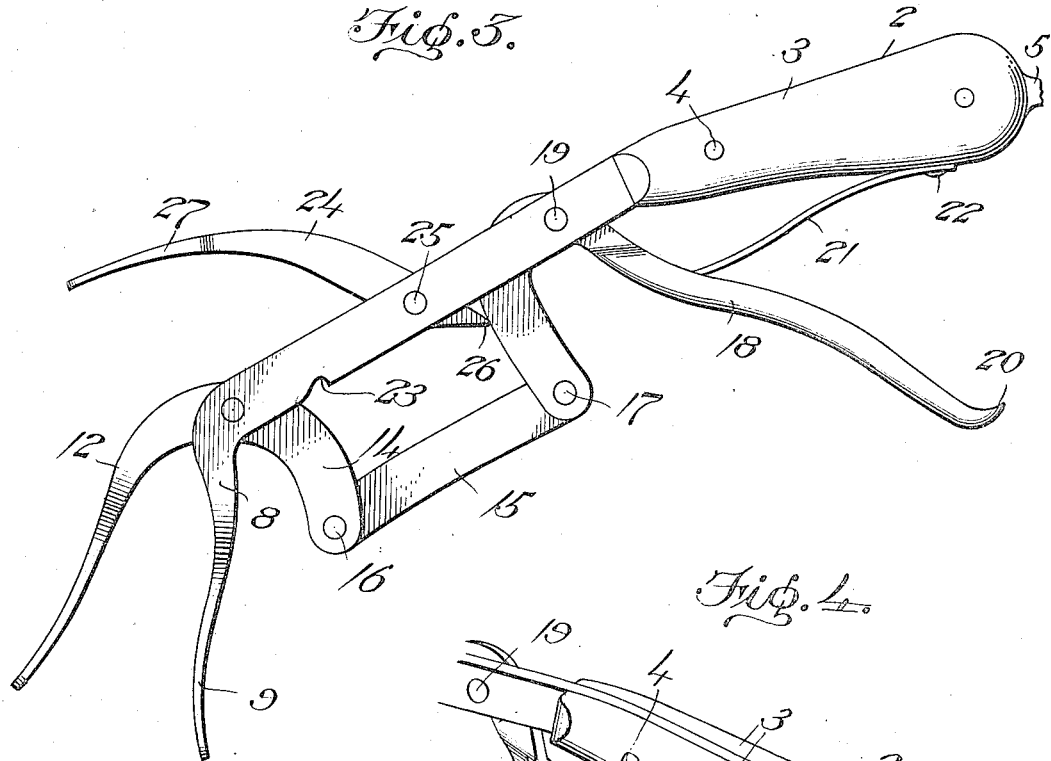
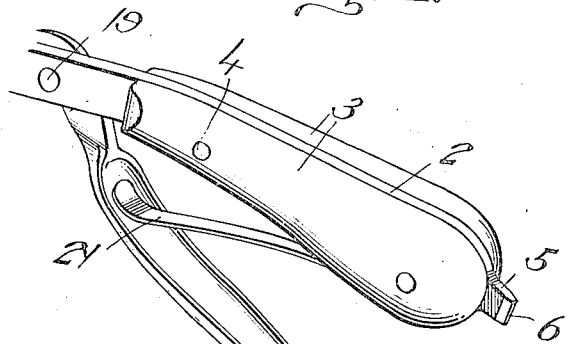
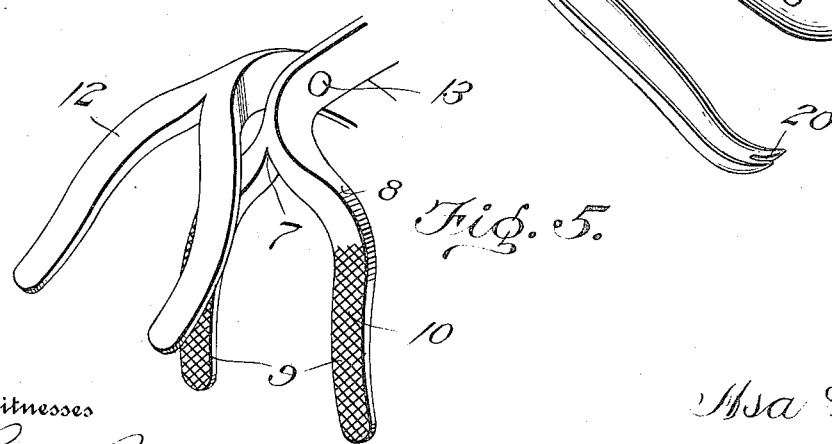
Witnesses
Inventor
Asa Gray,
By Richard B. Owen.
Attorney

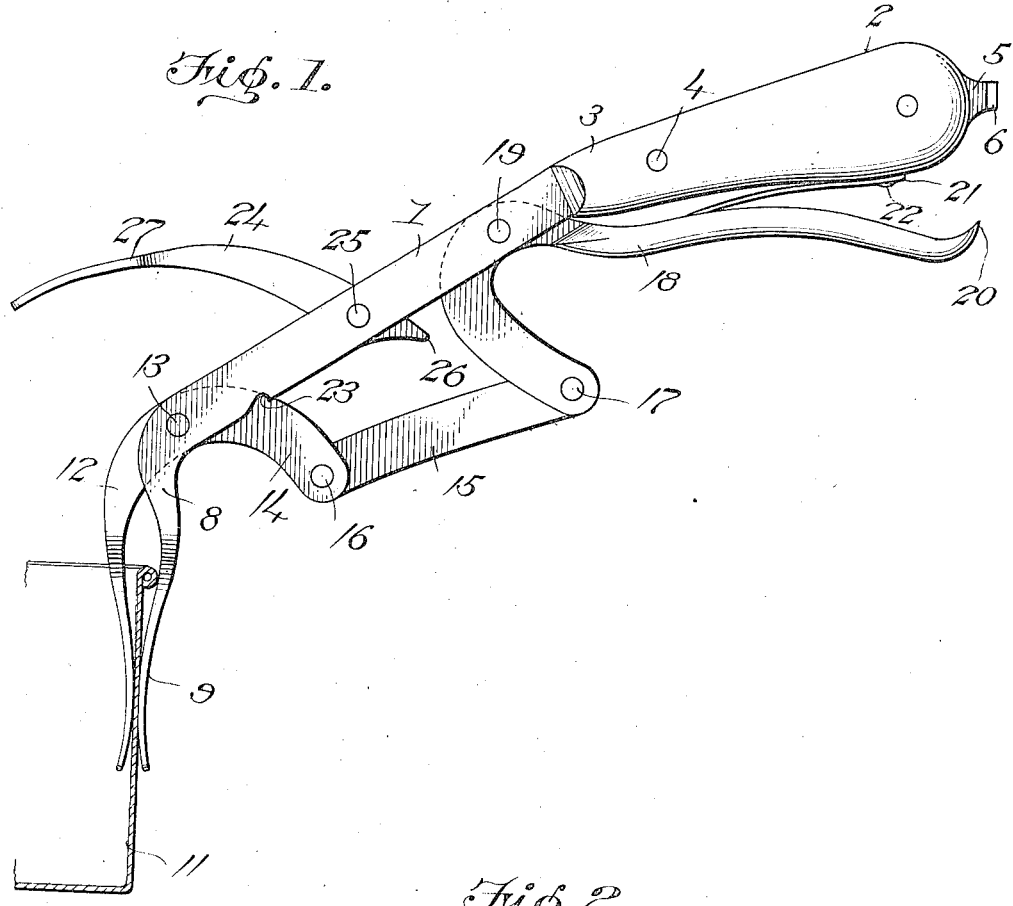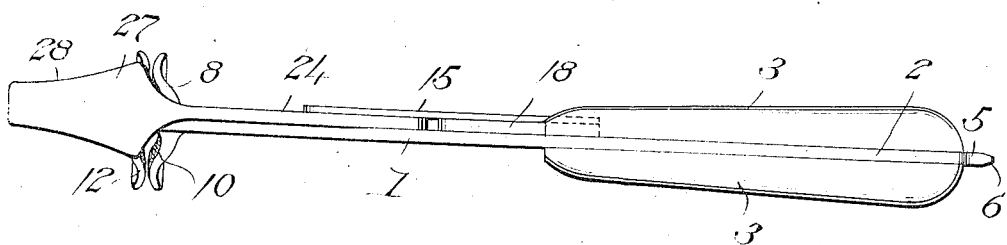

UNITED STATES PATENT OFFICE.

ASA GRAY, OF BAILEYTON, TENNESSEE.

IMPLEMENT.

1,219,726.

Specification of Letters Patent.

Patented Mar. 20, 1917.

Application filed September 3, 1914. Serial No. 860,115.

*To all whom it may concern:*

Be it known that I, ASA GRAY, a citizen of the United States, residing at Baileyton, in the county of Greene and State of Tennessee, have invented certain new and useful Improvements in Implements, of which the following is a specification.

My invention relates to implements and more particularly to that class of implements including a plurality of tools for performing various functions, the tools coöperating with each other for facilitating the efficient operation of the implement.

Another object of my invention resides in the provision of an improved means for lifting a vessel, including a pair of jaws, one of which is movable, the jaws having novel means associated therewith for facilitating the operation thereof and also provides novel means for normally holding the jaws in an open position.

A further object of my invention resides in the provision of a novel means mounted on the shank of the implement for supporting a pan or other vessel, which is engaged by the jaws from the upper surface of a stove, about an opening in the stove when the vessel is of a smaller diameter than the opening, the supporting means also serving the purpose of limiting the outward movement of the jaws.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claim forming a part of this specification.

In the drawings:—

Figure 1 is a side elevational view of my invention in engagement with a portion of a pan or vessel;

Fig. 2 is a top plan view of my invention;

Fig. 3 is a side elevational view of my invention in an open position;

Fig. 4 is a fragmentary perspective view of my invention showing the handle members and the positioning of the spring;

Fig. 5 is a fragmentary perspective view of the clamping jaws showing especially the serrated faces thereof.

Referring more particularly to the drawings in which similar reference numerals designate like or corresponding parts throughout the different views, I provide a shank 1 which in this instance is formed from a single piece of flat metal, one end of which is inclined at a slight angle to the shank and diverged toward its terminal as at 2, the enlarged end having handle sections 3 secured on the opposite sides thereof by means of suitable fastening devices 4, preferably rivets, the sections 3 being rounded at their outer edges and constitute a substantially circular handle. It is preferable that the sections be formed of wood or other insulating material for facilitating the handling of the device. The terminal of the enlarged end is reduced and extended beyond the handle sections 3 to form an extension 5, the latter being beveled as at 6 and constitutes a screw driver. The opposite end of the shank 1 is bent at an angle to the main portion thereof and is split as at 7, the portions formed by the split being offset and bent to provide substantially U-shaped extensions to constitute a rigid clamping jaw 8, the arms 9 of which are serrated on their inner face as at 10 for facilitating the engagement of the jaw with the outer surface of a pan or vessel 11, and are further slightly curved intermediate their ends to prevent engagement with the rim of the pan.

For the purpose of removably holding the pan 11, I have provided a movable jaw 12 similar in construction to the rigid jaw 8 and have pivotally mounted the same by means of a pin 13 on the shank 1 adjacent the point of distortion of the rigid jaw, the movable jaw being arranged for alinement with the rigid jaw as clearly shown in Fig. 5. The inner end of the movable jaw is slightly curved as at 14 and has a link 15 pivotally secured adjacent the inner terminal thereof by means of a suitable pin 16, the opposite end of the link being pivotally mounted by means of a pin 17 on the inner end of a hook-shaped lever 18, the lever being pivotally mounted by a suitable fastening device, preferably a pin 19 at the point of distortion of the hook to the shank 1 at a point adjacent the sections 3. The handle end of the lever 18 is slightly offset and arranged to conform substantially to the shape of the handle of the shank. The other terminal of the handle portion of the lever 18 is bent inwardly and provided with a longitudinally extending slot which constitutes a tack puller 20, the inner surface of the handle portion of the lever 18 being provided with a longitudinally extending recess which is arranged about the slot for facilitating the engagement of the tack puller and for another purpose to be hereinafter described.

In order to hold the jaws normally in an extended position, I have provided a suitable elastic element, preferably a leaf spring 21 rigidly secured at one end by means of a pin 22, to the under surface of the handle of the shank, the free end of which spring is arranged in the recess in the inner surface of the handle portion of the lever 18 and serves the purpose of preventing transverse movement of the handle and the lever 18, during operation.

Means has also been provided for cutting wire and in this instance consists essentially of a recess 23 provided in the shank 1 adjacent the point of distortion of the rigid jaw 8 and arranged for coöperation with the curved portion 14 of the movable jaw, the sides of the shank about the recess being beveled to provide a cutting edge for facilitating the operation of the wire cutter, the latter being operated in a manner similar to the operation of the jaws. For the purpose of supporting the implement when the same is used in the capacity of a pan lifter, when it is desired to heat the contents in the pan 11, assuming that the pan is of a smaller diameter than the opening in the stove, I have provided a substantially arcuate metallic element 24 and rigidly secured the same adjacent one end thereof to a point approximately intermediate the ends of the shank 1 and by means of a suitable fastening device 25, the inner end of the element extending beyond the lower edge of the shank and constituting a stop 26 for engagement with the hook portion of the lever 18 for controlling the outward movement of the jaws. The opposite end of the element 24 is enlarged adjacent its terminal as at 27, the sides of the enlargement being slightly tapered as at 28 to the outer terminal of the element, the terminal of the element being normally positioned beyond the rigid jaw 8 when the implement is held in an operative position for facilitating the engagement of the tapered enlarged end 27 with the upper surface of the stove about the opening when it is desired to quickly heat the contents of the pan 11. The enlarged end 27 also serves the dual purpose of a stove lid lifter as is obvious.

The operation of my invention is as follows:—

Assuming that it is desired to lift the receptacle 11, the rigid jaw 8 is placed in engagement with the outer surface of the pan and the movable jaw 12 is brought into engagement with the inner surface by the exertion of a pull on the hook lever 18 through the medium of a connecting link 15, the serrated surface facilitating the engagement of the jaws with the pan. If it is desired to heat the contents of the receptacle, the outer enlarged end of the element 24 is rested upon the upper surface of the stove about an opening therein, allowing the pan which is smaller in diameter than the opening to be arranged in close relation with a fire. To release the pan from the jaws, the hook lever is released and due to the pressure of the spring 21 on the hook lever 18, the jaws will be made to move apart, the outward movement thereof being limited by the stop 26 on the element 24. The operation of the stove lid lifter, screw driver and tack puller are thought to be obvious and there is no need for setting forth the description of the operation.

Although I have shown and described the preferred embodiment of my invention, I desire to be understood that I am not limited to the exact details shown, however, great stress is laid upon the novel construction and arrangement of the jaws and the means for operating the same, also the novel element carried by the shank for supporting the implement when used as a pan lifter and for limiting the outward movement of the jaws.

From the above description taken in connection with the accompanying drawings it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters Patent, is:—

An implement comprising a shank having a substantially U-shaped jaw on one end thereof and extended at an angle to the shank, the arms of the jaw being arranged in spaced parallel relation with each other, a similar formed movable jaw co-acting with the first mentioned jaw and having a curved shank portion pivotally connected to said other shank, an arm projecting from said first shank at angle thereto and extended to have its outer end lie above and in spaced relation relative to said jaws, the outer extremity of said arm being flattened, a hand lever pivoted to said first shank and co-extensive with said handle, a link connecting one end of said hand lever to the shank of the movable jaw, and means normally tending to hold said jaws opened, said arm being arranged to provide a stop to limit the open position of said jaws.

In testimony whereof I affix my signature in presence of two witnesses.

ASA GRAY.

Witnesses:
O. C. MORRISON,
W. H. GRAY.